United States Patent [19]

Petersen

[11] 4,407,578
[45] Oct. 4, 1983

[54] EFFICIENT ELECTROMAGNETIC ACTUATOR USABLE AS PHOTOGRAPHIC SHUTTER

[75] Inventor: Christian C. Petersen, Westwood, Mass.

[73] Assignee: Polaroid Corporation, Cambridge, Mass.

[21] Appl. No.: 374,503

[22] Filed: May 3, 1982

[51] Int. Cl.³ .................... G03B 9/08; H02K 33/18
[52] U.S. Cl. .................................. 354/235; 310/13; 310/27
[58] Field of Search .............. 354/227, 234, 235; 310/13, 14, 27

[56] References Cited

U.S. PATENT DOCUMENTS

| 2,833,968 | 5/1958 | Karlson . | |
| 3,176,170 | 3/1965 | Fulton et al. | 354/235 X |
| 3,439,198 | 4/1969 | Lee | 310/27 X |
| 3,723,780 | 3/1973 | Gillum | 310/13 |
| 4,079,400 | 3/1978 | Kondo | 354/234 |
| 4,136,293 | 1/1979 | Patel | 310/13 |
| 4,161,666 | 7/1979 | Bacsanyi et al. | 310/27 |
| 4,227,100 | 10/1980 | Ezekiel et al. | 310/13 |
| 4,306,788 | 12/1981 | Ogawa et al. | 354/235 X |
| 4,306,793 | 12/1981 | Date et al. | 354/234 X |
| 4,326,786 | 4/1982 | Uchiyama et al. | 354/235 X |

FOREIGN PATENT DOCUMENTS 136814  8/1960  U.S.S.R. .................. 310/27

Primary Examiner—John Gonzales
Attorney, Agent, or Firm—Leslie J. Payne

[57] ABSTRACT

An electromagnetic actuator is disclosed comprising a core assembly including a plurality of pairs of permanent magnets aligned along a given axis. Each of the pairs of magnets have like magnetic poles facing each other and opposite magnetic poles facing away. The pairs of magnets are spaced apart along the given axis and opposite poles of adjacent pairs face each other. Regions of high density magnetic lines of flux of opposite polarity extend generally transversely of the given axis from adjacent pairs. Included are means for providing a low magnetic reluctance between the spaced apart adjacent pairs. Also included are means for defining a continuous low reluctance path extending alongside the core from the magnetic pole forming one end of the core to the magnetic pole forming the other end thereof and spaced over the regions of high magnetic density so as to define magnetic gaps to the core in the area of the regions. Electrical conductors are supported within the magnetic gaps for translational movement relative to the core.

5 Claims, 11 Drawing Figures

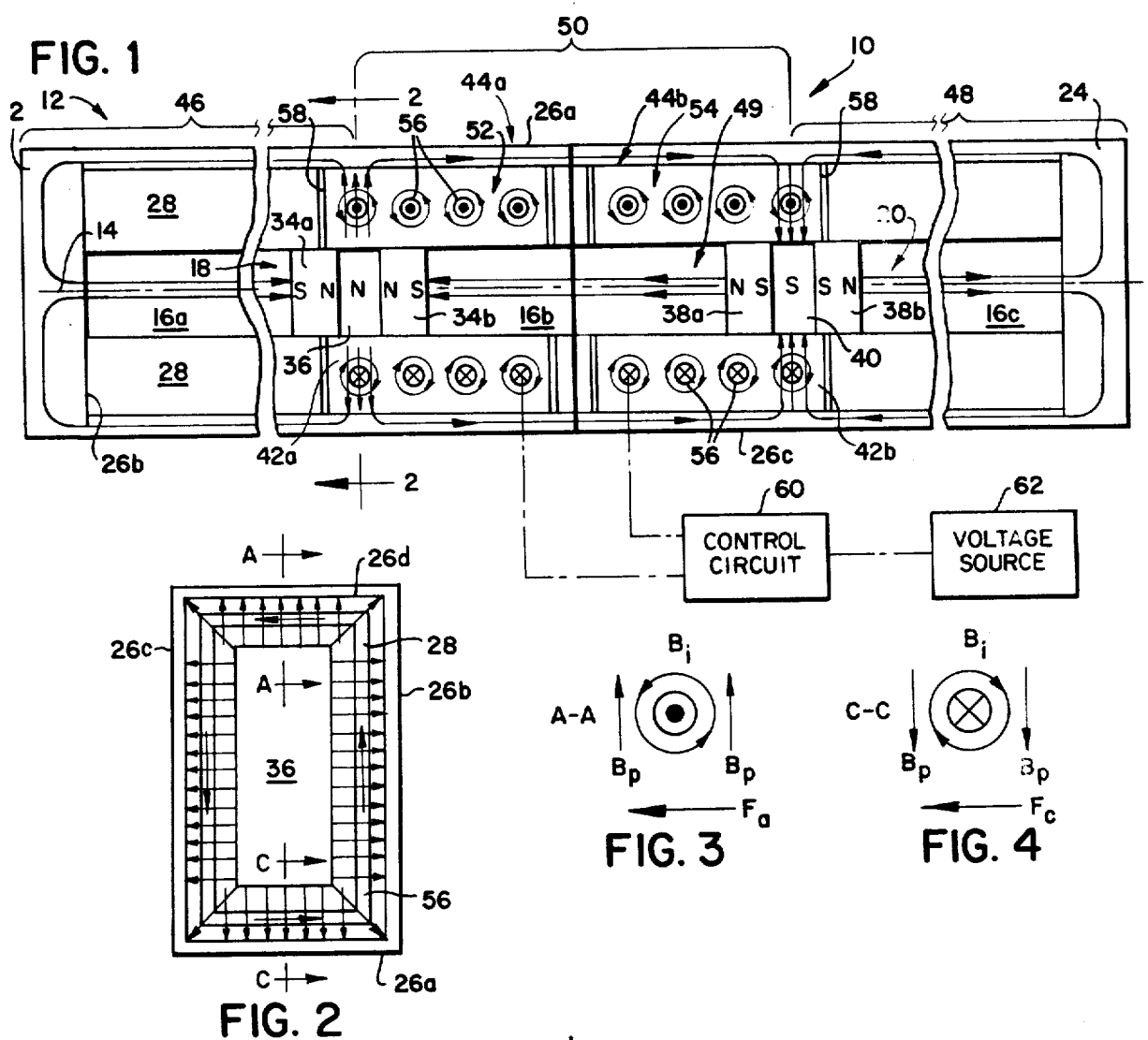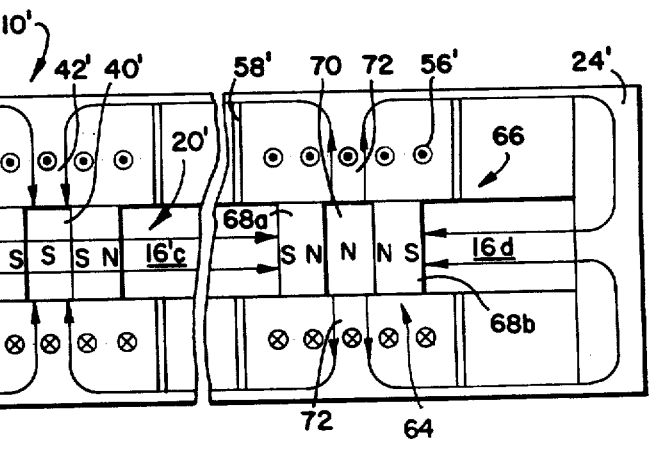

EFFICIENT ELECTROMAGNETIC ACTUATOR USABLE AS PHOTOGRAPHIC SHUTTER

BACKGROUND OF THE INVENTION

This invention relates to electromagnetic actuators. More particularly, it relates to improving the efficiency of such actuators.

Linear actuators have been known in the art for many years. One type that has been used in a wide variety of applications is the so-called voice coil or moving coil motor. In motors of this type, when a current is applied to a coil positioned in a magnetic field with a segment of the coil perpendicular to the field, a force is exerted on the coil segment. The direction of this force is dependent upon the direction of current flow and the direction of the magnetic field. For a magnetic field of given density, the force produced is directly proportional to the applied current. Because of this proportionality, moving coil linear actuators have been widely used as electromechanical transducers. Also, such motors have been used to precisely control the position of an output member. In the computer industry, for instance, they precisely move magnetic heads that read or write data on rotating data storage discs. In the photographic field, these motors have been useful for effecting actuation of shutter blades. There exists a wide variety of motor constructions for driving shutter blades. U.S. Pat. No. 4,227,100 discloses an electromagnetic linear actuator having two movable and independently actuatable coils energized by a single magnetic circuit. U.S. Pat. No. 4,306,793 discloses an electromagnetic actuator usable for driving a pair of shutter blade assemblies.

With motors of the above type, it is important that they are as efficient as possible and that their output response be uniform. Towards this end, it is desirable to control the lines of flux so that they travel through the working gap and coil in one direction with respect to the coil windings.

One common approach is to place a magnetic field reinforcing member, for instance, a steel plate, above the coil windings so that magnetic lines of flux emanating from a magnetic field below the windings travel completely through the coil windings. Another approach for controlling flux is disclosed in U.S. Pat. No. 4,306,788. However, this patent discloses a relatively complicated actuator having a plurality of magnetic circuits wherein only a single coil can operate a shutter arrangement. Examples of other known approaches for improving the efficiency of a motor by controlling the lines of flux are shown in U.S. Pat. Nos. 2,833,968 and 3,723,780.

SUMMARY OF THE INVENTION

The present invention provides an improved electromagnetic actuator. Included in the actuator is a core assembly having a plurality of pairs of permanent magnets aligned along a given axis. Each of the pairs of magnets has like magnetic poles facing each other and opposite magnetic poles facing away. The pairs of magnets are spaced apart along the given axis with means providing a continuous low magnetic reluctance path therebetween. Opposite poles of the adjacent pairs face each other. The core assembly produces regions of high density magnetic lines of flux of opposite polarity extending generally transversely of the given axis from the adjacent pairs. Means are provided for defining a continuous low reluctance path extending alongside the core assembly from the magnetic pole forming one end of the core to the magnetic pole forming the other end thereof. This means is spaced over the regions of high density magnetic lines of flux so as to define magnetic gaps to the core in the area of the regions. Electrical conductor arrangements are provided which are supported within the magnetic gaps and associated with each of the regions of high density magnetic flux for translational movement generally parallel to the given axis with respect to the core assembly. Included are means for coupling each of the electrical conductor arrangements to a voltage source for producing a force effecting movement generally parallel to the given axis between the electrical conductor arrangements and the core assembly.

As a result of the foregoing, the lines of magnetic flux travel through the magnetic gaps only and do not travel back across the conductors during translation so as to alter the response of these conductors.

Among the other objects of the present invention are, therefore, the provision of an improved electromagnetic apparatus which has improved efficiency and greater predictability of response; the provision of an improved electromagnetic actuator having a plurality of low reluctance paths arranged to control magnetic lines of flux to plural working magnetic gaps; and, the provision of an electromagnetic actuator of the above type having a plurality of flux producing means positioned in side-by-side relationship.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawings wherein like numbers have been employed in the different figures to denote the same parts and wherein:

FIG. 1 is a schematic diagram of a longitudinal section of a linear actuator according to the principles of the present invention;

FIG. 2 is a vertical sectional view taken substantially along the section line 2—2 of FIG. 1;

FIG. 3 is a vertical sectional view of a single wire of the winding of FIG. 2 taken along the line A—A thereof;

FIG. 4 is a view similar to FIG. 3 taken along the line C—C of FIG. 2;

FIG. 5 is a schematic diagram of another embodiment of a longitudinal section of a linear actuator according to the principles of the present invention;

DESCRIPTION OF THE PREFERRED EMBODIMENTS

Figure 6A:
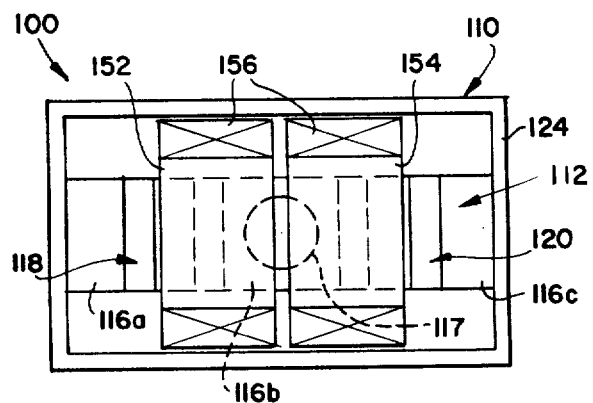
FIGS. 6A and 6B are simplified schematic views of a photographic shutter mechanism making use of the principles of the present invention showing the shutter in its closed and open positions, respectively.

Referring to FIGS. 1 and 2, there is illustrated an electromagnetic actuator 10 embodying the principles of the present invention. Included interiorly of the actuator 10 is a core assembly 12 having along a longitudinal axis 14 thereof a plurality of core segments 16a–c and a pair of magnetic flux producing assemblies 18, 20 provided for producing relatively high density flux.

The material of the core segments 16a–c has low magnetic reluctance, such as 1005 steel, and a generally rectangular cross-section; see FIG. 2. The core segments 16a, 16c are respectively connected to rectangular end caps 22, 24 and the core segment 16b is connected to and between the flux producing assemblies 18, 20. These end caps are made from a low magnetic reluctance material. The end caps 22, 24 in turn are interconnected by a plurality of rectangular plates 26a–d made of a low magnetic reluctance material such as 1005 steel. The plates 26a–d are spaced radially from the axis 14 so that they define longitudinally extending spaces 28 between ends of the core assembly 12 and the low reluctance plates 26a–d.

Now reference is made back to the pair of flux producing means or assemblies 18, 20. The flux producing assembly 18 produces an effective north pole N condition, while the flux producing means 20 produces an effective south pole S condition.

Looking now at the north flux producing means 18, it will be seen as comprising a pair of permanent magnets 34a, 34b, preferably of the rare earth type. Each is axially spaced apart from the other along the axis 14 with a core piece 36 sandwiched therebetween. Preferably, the core piece 36 is made of a low reluctance and high permeable material, such as 1005 steel. In this arrangement, the magnets 34a, 34b are axially positioned with the north poles N facing one another. This allows the lines of magnetic flux to extend transversely to the longitudinal axis 14. In this regard, reference is made to the arrows in FIGS. 1 and 2 showing the lines of flux emanating outwardly from the core piece 36.

The second high density flux producing assembly 20 is similar to that of the first assembly 18. However, in the assembly 20, the pair of axially spaced-apart permanent magnets 38a, 38b have their south poles S facing towards each other with a core piece 40 of low magnetic reluctance and high permeability sandwiched therebetween. The core piece 40 becomes an effective south pole S and defines a region of high density magnetic flux lines. The flux lines are as shown in FIG. 1, except their direction is reversed and instead of emanating from core piece 40 they project towards core piece 40.

It will be appreciated that these regions of high density flux define working magnetic gaps 42a, 42b in the space 28 for armature assemblies 44a, 44b to translate relative thereto. Preferably, the gaps 42a, 42b are air gaps. The magnetic working gap 42a is best shown substantially in FIG. 2 surrounding the core piece 36 and extending between it and the plates 26a–d. The second magnetic working gap 42b extends between the core piece 40 and the plates 26a–d.

The present invention gives rise to the highly effective control of the magnetic lines of flux of the flux producing assemblies 18, 20 so as to optimize efficiency of the actuator 10. Towards this end, the present invention controls the lines of magnetic flux so that they substantially go through the working magnetic gaps 42a, 42b in only one direction at each gap. This insures that they go through each armature assembly 44a, 44b in only one direction. Moreover, these lines of flux do not pass through any of the remaining portion of the spaces 28. Thus, the flux lines will not pass back through either armature assembly in its area of travel so as to reduce the efficiency of the actuator 10.

As best seen in FIG. 1, there are shown magnetic circuits 46, 48, and 50. The first circuit 46 defines a path for the lines of magnetic flux extending through the magnetic gap 42a to the plates 26a–d, leftwardly along the plates 26a–d to the left end cap 22, and then along core segment 16a to the south pole S of the permanent magnet 34a. Because of the continuous low reluctance of the plates 26a–d, the end cap 22 and the core segment 16a, the lines of magnetic flux will not travel back through the spaces 28.

The magnetic lines of flux in the working magnetic circuit 50 extend from the permanent magnets 34a, 34b substantially through the magnetic gap 42a and rightwardly to the effective south pole S defined by the permanent magnets 38a, 38b. In this regard, the lines of flux travel along the low reluctance paths defined by the plates 26a–d and through the working magnetic gap 42b to the core piece 40.

Because of the present invention, it will be observed that the lines of magnetic flux from the north pole N of the permanent magnet 38a travel in a continuous low reluctance path to the south pole S of the permanent magnet 34b along a magnetic circuit 49 defined by the core segment 16b. Thus, the lines of flux between these magnets will not travel through the spaces 28 and interfere with the armature assemblies.

In the magnetic circuit 48, the magnetic lines of flux also extend from the north pole N of the permanent magnet 38b, along core segment 16c, to the end cap 24 and then leftwardly along the low reluctance paths defined by the plates 26a–d, through the working magnetic gap 42b to the effective south pole S defined by the core piece 40. Thus, these lines of flux will not travel through the spaces 28 and interefere with the armature assemblies.

Accordingly, it should be appreciated from the above description the magnetic lines of flux from the plural and adjacent flux producing assemblies pass only through the working magnetic gaps 42a, 42b.

Turning back to the armature assemblies 44a, 44b, each includes a coil assembly 52, 54, respectively, supported for translational movement in the spaces 28. Each coil assembly is associated with a respective flux producing assembly 18 and 20. Current may pass through the coil assemblies 52, 54 so as to interact with the high density flux of the flux producing assemblies 18, 20. This effects electromotive forces to move the coil assemblies 52, 54 in a manner to be described. As shown in FIG. 1, there are four representative turns of field coil windings 56 in each assembly 52, 54. The field coil windings 56 are wound upon a rectangular spool (not shown) of nonconducting and non-magnetic material. These spools are supported on the segmented core 16a–c for axial translation relative thereto.

Looking now at FIG. 2, the direction of current flow in the field coil windings 56, as indicated by the arrows, is for purposes of illustration depicted in a counter-clockwise direction. To better understand the generation of forces by the coil assemblies 52, 54 reference is made to two representative points on the field coil 56.

These points are indicated by section lines A—A and C—C and are better shown in FIGS. 3 and 4. Looking first at FIG. 3, the direction of the magnetic lines of flux $B_p$, due to the permanent magnets 34a, 34b, are shown as extending upwardly with respect to coil segment at A—A. Further, with the direction of current flow at this point out of the paper, application of the "right hand rule" shows that the induced magnetic flux $B_i$ due to current flow through the coil segment will be a circular field extending in a counterclockwise direction. Accordingly, it will be seen that the lines of flux to the left of the wire segment are constituted by the upwardly extending lines $B_p$ and the downwardly extending lines $B_i$. Such flux lines tend to cancel one another out. On the other hand, on the right hand side of the wire segment, it will be seen that the lines of flux $B_p$ and the lines of flux $B_i$ due to the induced magnetic field are both pointed upwardly. They thereby reinforce one another. This results in a net force upon the wire to the left as indicated by the arrow $F_a$. A similar analysis of the fields present around the wire segment along C—C is shown in FIG. 4. Such an analysis would show a net force $F_c$, also to the left, which is consistent with the force $F_a$. A similar analysis at any point around the field coil windings 56 of the field coil 52 will yield the same result; that is, there would be a net force to the left.

It will be appreciated that the electromotive force imparted to the coil assembly 54 is produced and controlled by the current flowing through its field coil. Thus, the direction of current flow in the field coils 56 determines the direction of coil assembly movement.

A control circuit 60 is provided to control the supply of voltage from, preferably, a DC source 62 to each of the coil assemblies 52, 54. The control circuit 60 controls and can vary the magnitude and polarity of the voltage being applied to the coil assemblies. The circuit 60 provides means for coupling the coil assemblies to the voltage source 62.

Because the coil assemblies 52, 54 respectively interact with magnetic fields of opposite polarity they will reciprocate in directions opposite to each other. With the flow of current through the field coil windings 56 as shown in FIG. 1 the coil assemblies 52, 54 will move apart from the positions indicated. By reversing the polarity of current to the coil assemblies 52, 54 they will move towards each other to the position shown in FIG. 1.

Reference is now made to FIG. 5 for purposes of showing another embodiment of this invention. The structure of this embodiment like that of the other embodiment has the same reference numerals with, however, the addition of a prime marking. In this embodiment, the actuator 10' has a third flux producing assembly 64 and associated therewith a third coil assembly 66. It will be seen that the flux producing assembly 64 is constructed similarly as the first flux producing assembly 18. More specifically, they both produce effective north poles N. Towards this end, the flux producing assembly 66 includes a pair of permanent magnets 68a, 68b, preferably, of the rare earth type. Sandwiched between the magnets 68a, 68b is a core piece 70, made of a material such as soft iron. Since the north poles N of the magnets 68a, 68b face each other, the core piece 70 becomes an effective north pole. Surrounding the core piece 70 is a working magnetic gap 72 through which the relatively high density flux travels and the third coil assembly 66 translates.

The high density flux from the core 70 traverses the gap 72 in the direction of the arrows and then travels in opposite longitudinal paths defined by the low reluctance plates 26'a–d. Some of this flux travels toward the effective south pole S, defined by the adjacent flux producing assembly 20', and reinforces the flux from flux producing assembly 18'. It will be seen the lines of flux from the north pole N of the permanent magnet 38b travel rightwardly along a magnetic circuit defined by the core segment 16c to the south pole S of the permanent magnet 68a. Also, the magnetic lines of flux emanating from the core piece 70 travel leftwardly along the path defined by the low reluctance plates 26'a–d back through the gap 42'b to the effective south pole of the core piece 40'. Thus, these lines of flux only traverse the space 28' at the working magnetic gaps 72 and 42'b. In this manner, it will be appreciated that the efficiency of the linear actuator 10' is not diminished. This is because the lines of flux of all the flux producing assemblies travel through the coil assemblies only at the working magnetic gaps. Hence, movement of these coil assemblies is reliably controlled.

Figure 6B:
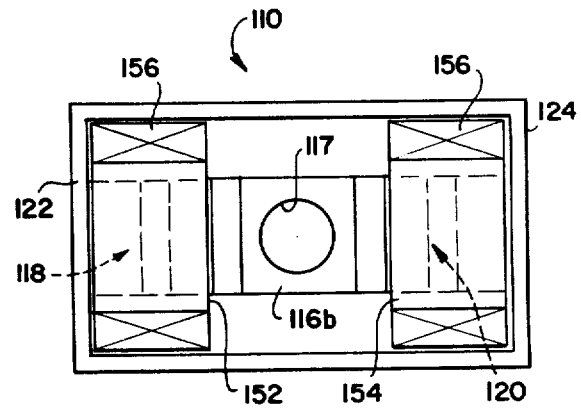
Figure 8:
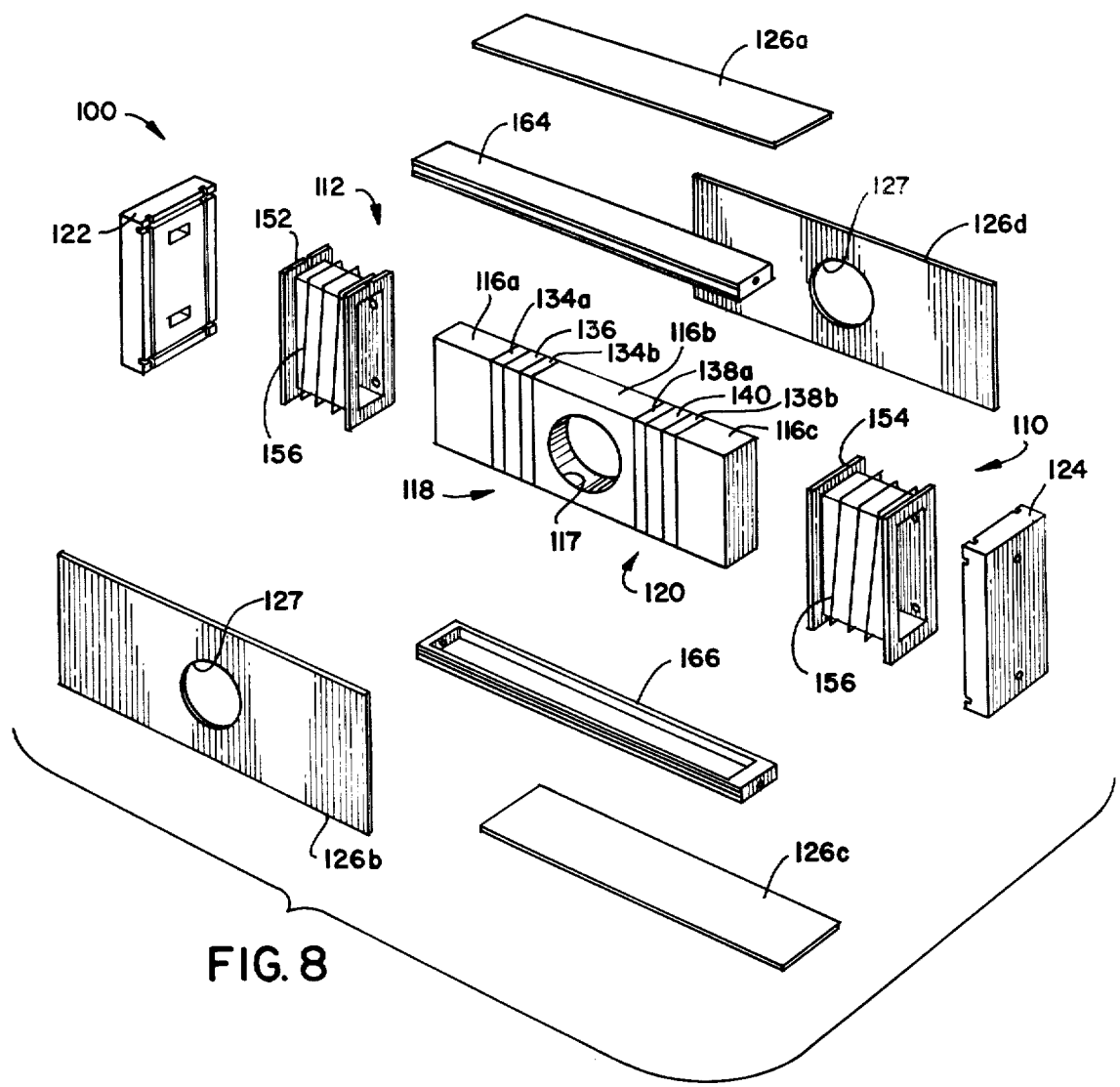
FIG. 8 is an exploded perspective view of a shutter mechanism, such as that schematically depicted in FIGS. 6A and 6B.

Looking now at FIGS. 6A, 6B and 8, there is disclosed a photographic shutter arrangement 100 using a linear actuator 110 similar to that described in FIGS. 1–4. The stationary core assembly 112 comprises a thin, rectangular cross-section of core segments 116a–c. The material of the segments 116a–c has relatively low magnetic reluctance. The segment 116b has a scene light admitting aperture 117 centrally located between flux producing assemblies 118, 120. Connected to opposite ends of the core assembly 112 are end caps 122, 124. Connected to and between the end caps 122, 124 are outer housing plates 126a–d. Aperatures 127 in alignment with the scene light admitting aperture 117 are provided in the plates 126b, 126d. The flux producing assemblies 118, 120 include respective pairs of rare earth magnets 134a, 134b; and 138a, 138b; and core pieces 136 and 140. Each of the core pieces 136, 140 produces regions of high density flux in the working magnetic gap (not shown). A pair of moving shutter coil assemblies 152, 154 are mounted for reciprocation with respect to the flux producing assemblies. These coil assemblies 152, 154 serve as the shutter blade elements which are movable in light intercepting relation with the aperture 117. Mounting rails 164, 166 have rectangular recesses into which the respective top and bottom portions of the core assembly 112 are received. Although not shown, Teflon pads are secured to the inside of the bobbins 156 and ride upon the rails 164, 166. Alternatively, the shutter coil assemblies 152, 154 can carry suitable shutter blade elements (not shown) thereupon.

Operation of the actuator 110 is believed apparent from the foregoing description of the embodiment shown in FIGS. 1-4. However, a brief explanation of the operation of the photographic shutter 100 will be described. Unblocking and then blocking of the scene light admitting aperture 117 is readily attainable by using a suitable photographic shutter control system (not shown). Such a system would be responsive to an exposure control system (not shown). To effect the longitudinal reciprocation of the coil assemblies 152, 154 necessary for exposure purposes, the shutter control system must simply generate a signal which controls the direction of current flow through the coil assemblies. The shutter coil assemblies 152, 154 move apart from one another to the position of FIG. 6B from that of FIG. 6A. This allows sufficient scene light to pass through the scene light admitting aperture 117. Reverse energization of the shutter coil assemblies 152, 154 results in movement of them towards each other to again block the scene light admitting aperture 117. Because no stray lines of flux interfere with the operation of the actuator 110, the actuator can be reliably and precisely used in a shutter mechanism.

Figure 7A:
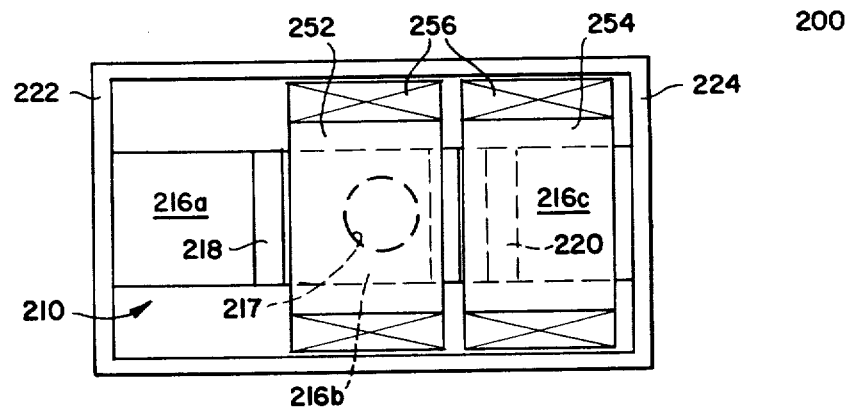
FIGS. 7A–7C are simplified schematic views of another embodiment of a photographic shutter mechanism showing the shutter blades in different positions.
Figure 7B:
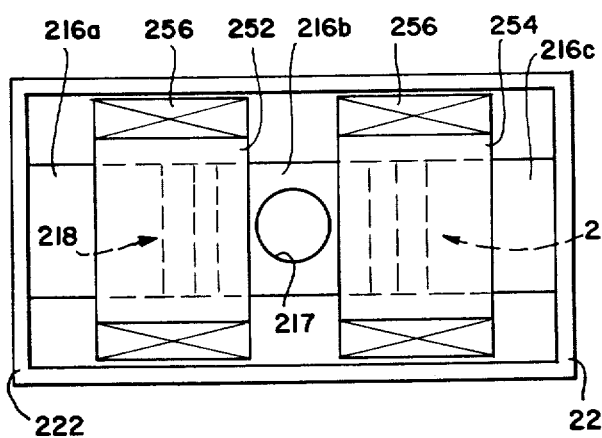
Figure 7C:
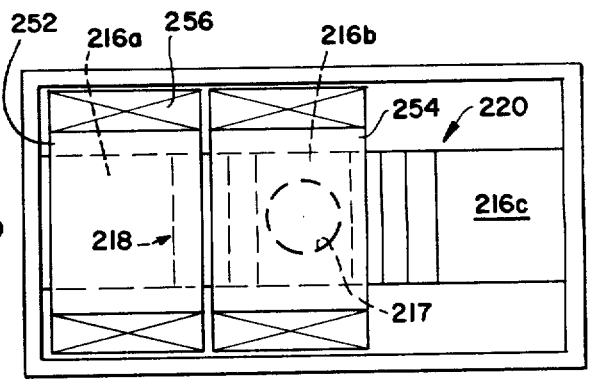

FIGS. 7A, 7B and 7C illustrate operation of a scanning aperture shutter 200 using an actuator 210 according to the present invention. The structure of this embodiment which is similar to the embodiment shown in FIGS. 6A-B will have the same reference numeral with, however, the prefix 2 substituted for the prefix 1. A typical starting position is illustrated in FIG. 7A. As depicted, both of the coil shutter blade assemblies 252, 254 are shown in their extreme right hand positions. In this condition, the left hand coil shutter blade assembly 252 serves by itself to completely block the scene light admitting aperture 217. Upon initiation of exposure, the left hand coil shutter blade assembly 252 is suitably energized to move to the left. This opens the aperture 217. Thereafter the second coil shutter blade assembly 254 is energized to follow the first assembly 252 in moving to the left. As shown in FIG. 7B, the delay in the following of the second coil shutter blade assembly 254 is controlled by a suitable automatic exposure control system (not shown) such that the aperture 217 would be open for a predetermined optimum time to permit passage of scene light therethrough. Looking now at FIG. 7C, it will be seen that following an exposure cycle, both coil shutter blade assemblies 252, 254 come to rest in their extreme left hand position with the right hand shutter blade 254 now blocking the aperture 217. With such an arrangement, the shutter need not be recocked; and, on the next exposure cycle, the right hand coil shutter blade assembly 254 will be the opening shutter blade, with the left hand blade assembly 252 following to the right back to the position illustrated in FIG. 7A so as to define the exposure interval.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. An electromagnetic actuator comprising:
   a core assembly including a plurality of pairs of permanent magnets aligned along a given axis, each of said pairs of magnets having like magnetic poles facing each other and opposite magnetic poles facing away, and said pairs of magnets being spaced apart along said given axis with means providing a continuous low magnetic reluctance path therebetween and with opposite poles of adjacent pairs facing each other to thereby produce regions of high density magnetic lines of flux of opposite polarity extending generally transversely of said given axis from adjacent pairs;
   means for defining a continuous low reluctance path extending alongside said core assembly from the magnetic pole forming one end of said core assembly to the magnetic pole forming the other end thereof and spaced over said regions of high density magnetic lines of flux so as to define magnetic gaps to said core in the area of said regions;
   electrical conductor arrangements supported within the magnetic gaps associated with each of the regions of high density magnetic flux for translational movement generally parallel to said given axis with respect to said core assembly; and
   means for coupling each of said electrical conductor arrangements to a voltage source for producing a force effecting relative movement generally parallel to said given axis between said electrical conductor arrangements and said core assembly.

2. The actuator of claim 1 wherein said permanent magnets are of the rare earth type.

3. The actuator of claim 2 wherein said means for defining a continuous low reluctance path alongside said core assembly includes an elongate member extending from one end portion of the core assembly to the other end portion.

4. The actuator of claim 3 wherein said electrical conductor arrangements include a field coil assembly associated with each of said regions of high density flux.

5. A shutter mechanism for use in controlling scene light to a focal plane including a core assembly including a plurality of pairs of permanent magnets aligned along a given axis, each of said pairs of magnets having like magnetic poles facing each other and opposite magnetic poles facing away, and said pairs of magnets being spaced apart along said given axis with means providing a continuous low magnetic reluctance path therebetween and with opposite poles of adjacent pairs facing each other to thereby produce regions of high density magnetic lines of flux of opposite polarity extending generally transversely of said given axis from adjacent pairs;
   means defining a first aperture in said low reluctance path between adjacent pairs of said magnets;
   means for defining a continuous low reluctance path extending alongside said core assembly from the magnetic pole forming one end of said core assembly to the magnetic pole forming the other end thereof and spaced over said regions of high density magnetic lines of flux so as to define magnetic gaps to said core in the area of said regions, said means defining a continuous low reluctance path alongside said core assembly including openings aligned with said first aperture to allow passage of scene light therethrough; and
   a blade mechanism including electrical conductor arrangements supported within the magnetic gaps associated with each of the regions of high density magnetic flux for translational movement generally parallel to said given axis with respect to said core assembly, said arrangements defining blades which are selectively cooperable with said first aperture to block and unblock scene light through said first aperture.

* * * * *